3,312,507
METHOD FOR HANDLING PULVERULENT
MATERIAL
Karl-Heinz Oehlrich, Marienbaderstr. 40, and Karl
Rudolf Schmidt, Bissingerstr. 7, both of Erlangen, Germany
Filed Dec. 27, 1965, Ser. No. 516,616
Claims priority, application Germany, Dec. 31, 1958,
S 61,211
15 Claims. (Cl. 302—66)

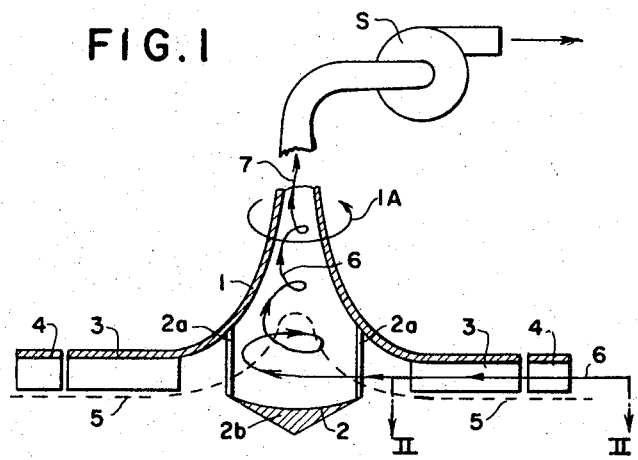
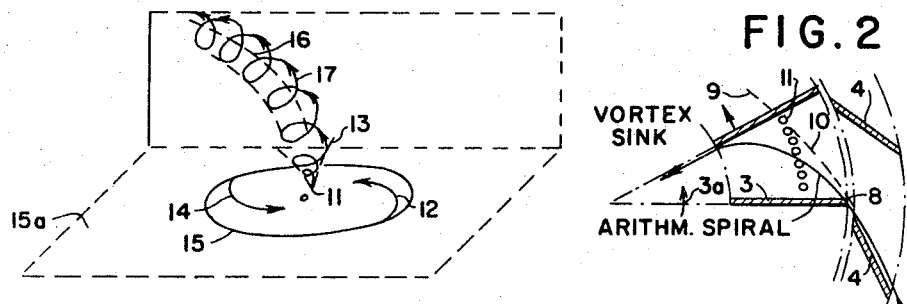
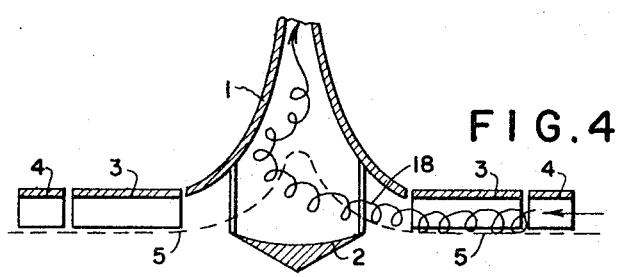
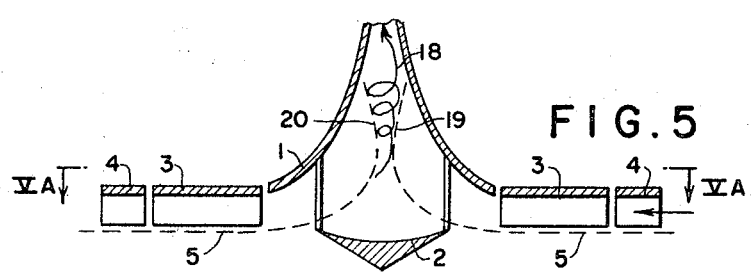

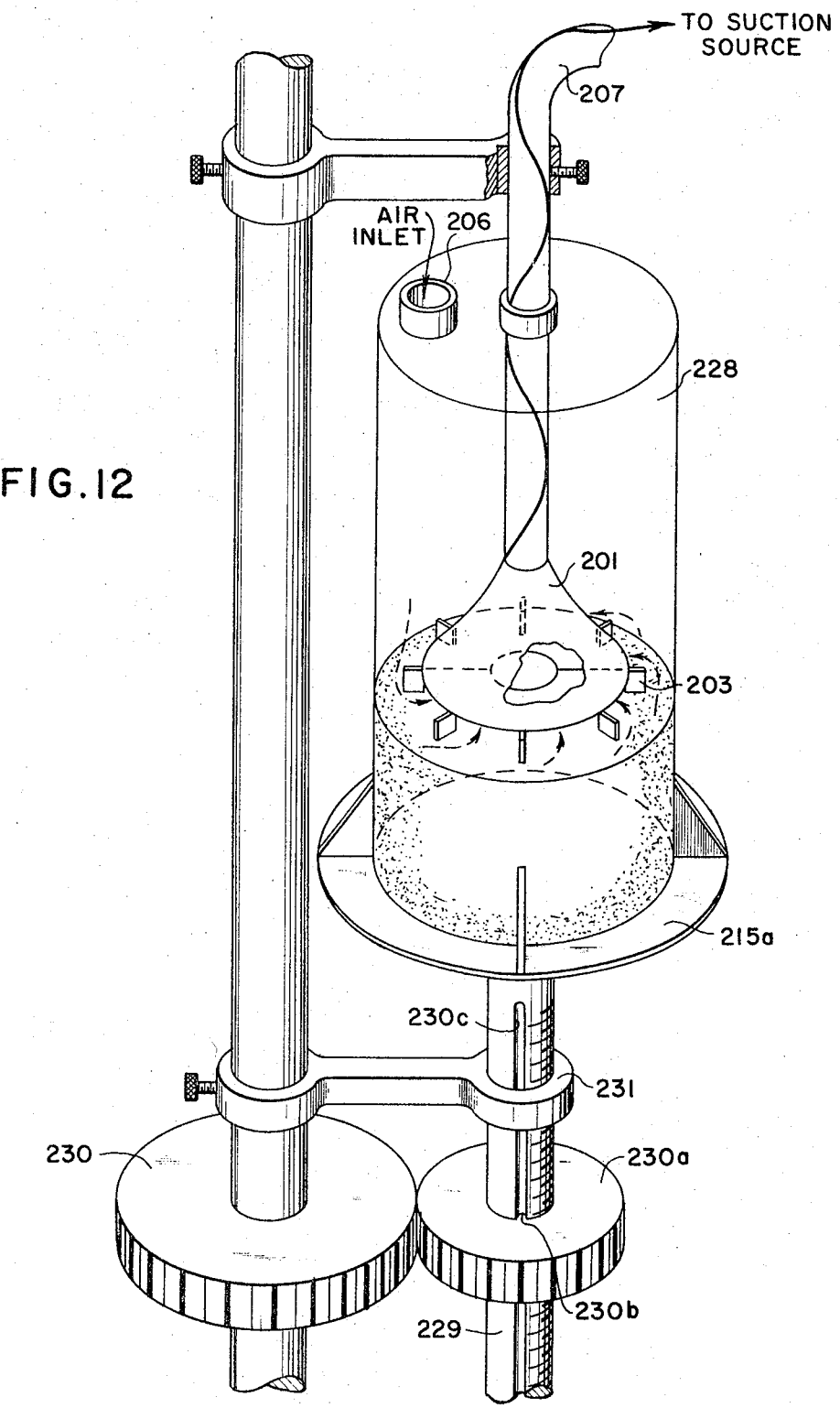

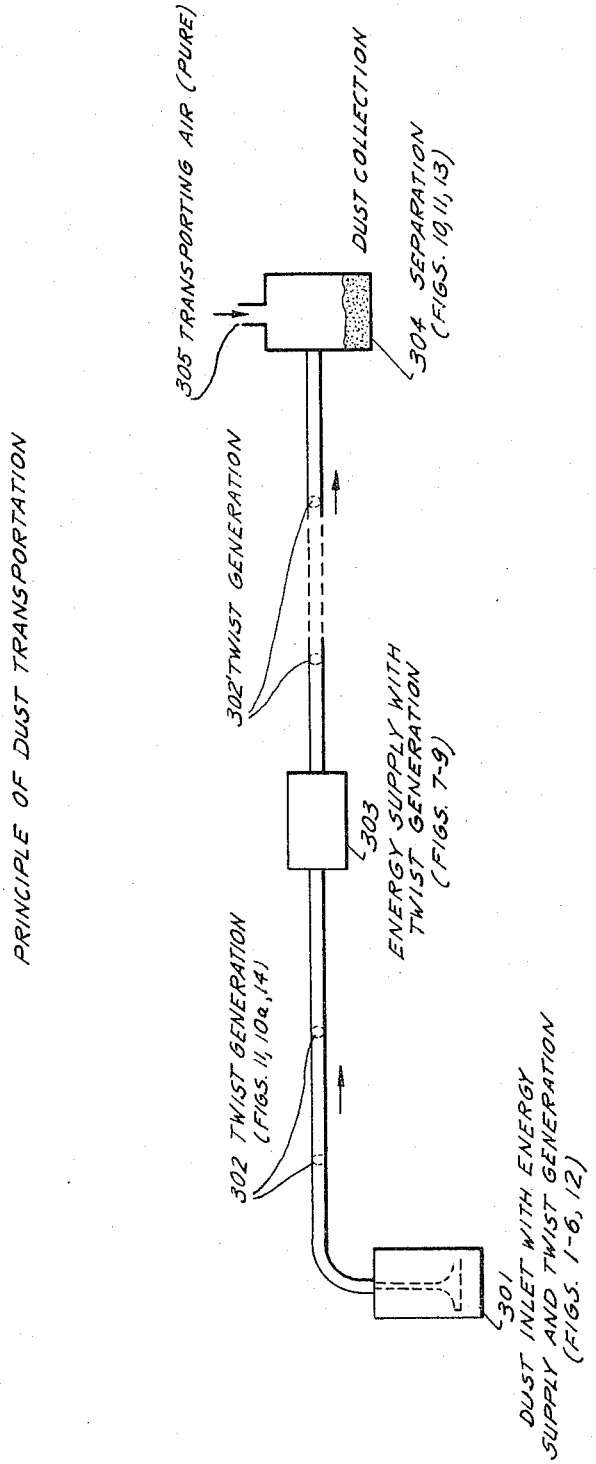

This application is a continuation-in-part of our copending application Ser. No. 348,363, filed Mar. 2, 1964, now issued as Patent No. 3,226,165, which in turn is a continuation-in-part of our copending application Ser. No. 862,570, filed Dec. 29, 1959, now abandoned.

This invention is related to the methods of producing relative forces for technological purposes by motion of fluid media on the principles disclosed in the application of Oehlrich et al., Ser. No. 835,886, filed Aug. 25, 1959, now issued as Patent No. 3,199,268. Said application Ser. No. 835,886 deals with the production of internal relative forces by the motion of flowing media and describes the utilization of such relative forces in flowing media for the pupose of separating or combining suspended particles for such purposes as separation, precipitation, sorting and conveying.

Our present invention concerns related methods for handling pulverulent material in the form of dust, granules or other finely distributed form as constituted by coal dust, cement raw material, grain, flue dust and other powder substances for the purpose of conveying, separating, classifying, depositing, discharging, heat treating or otherwise processing such materials. The particles to be handled or processed in such manner may constitute an undesired material, such as waste dust to be eliminated, or the particle material may constitute a commercially valuable product.

According to our invention, the processing in the above-mentioned general sense of such pulverulent products is facilitated and economically performed by utilizing in a particular manner the relative forces within fluids whose production and utilization, in principle, is disclosed in the above-mentioned copending application Ser. No. 835,886. Another feature of the present invention resides in a novel and advantageous production of the rotary flow or tornado flow of fluid and hence of the desired relative forces.

The invention is particularly applicable for such purposes as entraining dust particles stored in a container and for exhausting them therefrom, as may be desirable for dust, for example coal dust, stored in a silo, or for removing dust particles as they drain onto the bottom of a dust separator.

The invention further relates to the production of rotating flowing motion for conveying dust particles along a helical path in conveyer conduits or other flow channels, or conduit vessels; and the invention is likewise applicable to again separate the dust thus conveyed, from the fluid media in which the dust is suspended during conveyance.

According to our invention, a rotating nozzle device with suction applied thereto through a suction conduit may be employed for sucking dust from a surface, for example a planar surface, and for producing in the suction conduit a rotating fluid flow which conveys the dust to another location. Such a nozzle consists, for example of a stationary blade assembly and a coaxial rotatable blade assembly having an axis of rotation coincident with the direction in which the medium is being sucked and conveyed. According to another feature, the rotary-nozzle device may consist only of a rotatably mounted assembly of guiding blades curving inwardly.

The foregoing and more specific objects, advantages and features of our invention, said features being set forth with particularity in the claims annexed hereto, will be apparent from and will be mentioned in the following description of the embodiments of the invention illustrated by way of example in the accompanying drawings in which:

FIG. 1 shows schematically, in sectional front view, a rotary-nozzle device;

FIG. 2 is a diagrammatic plan view showing flow paths of particles and taken along line II—II of FIG. 1;

FIG. 3 is a diagrammatic perspective view to explain the relative flow paths tending to take place in the device of FIG. 1;

Figure 5A:
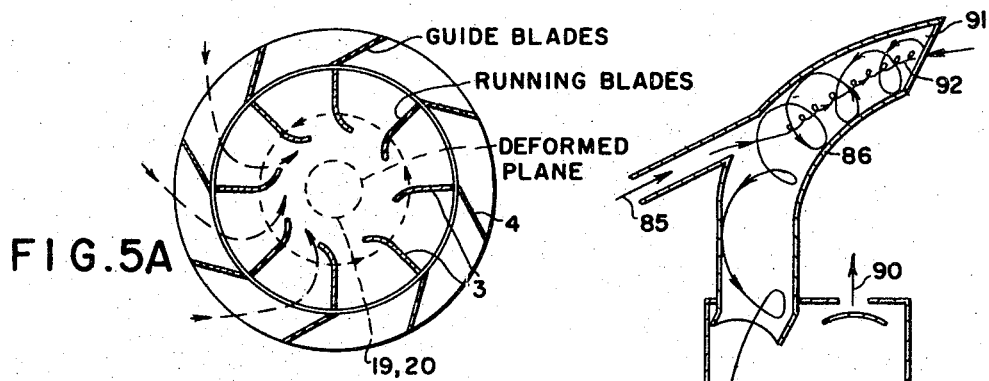
Figure 13:
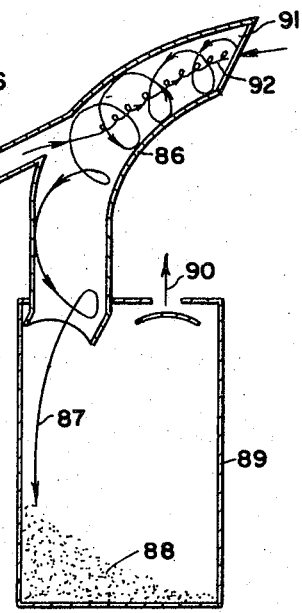
Figure 6:
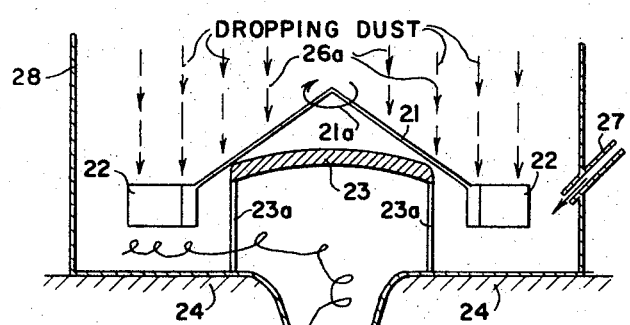
Figure 15:
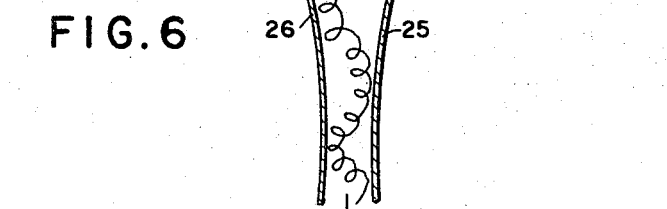
Figure 14:
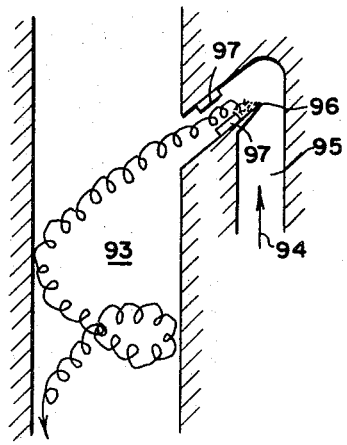
Figure 7:
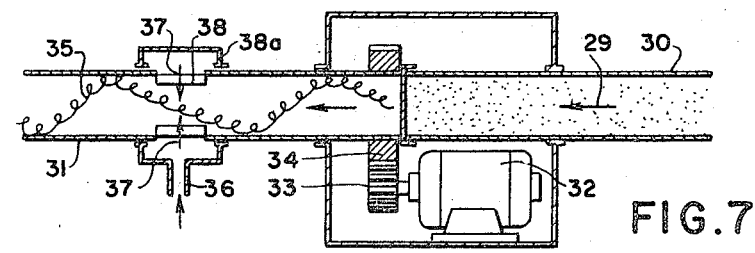
Figure 7A:
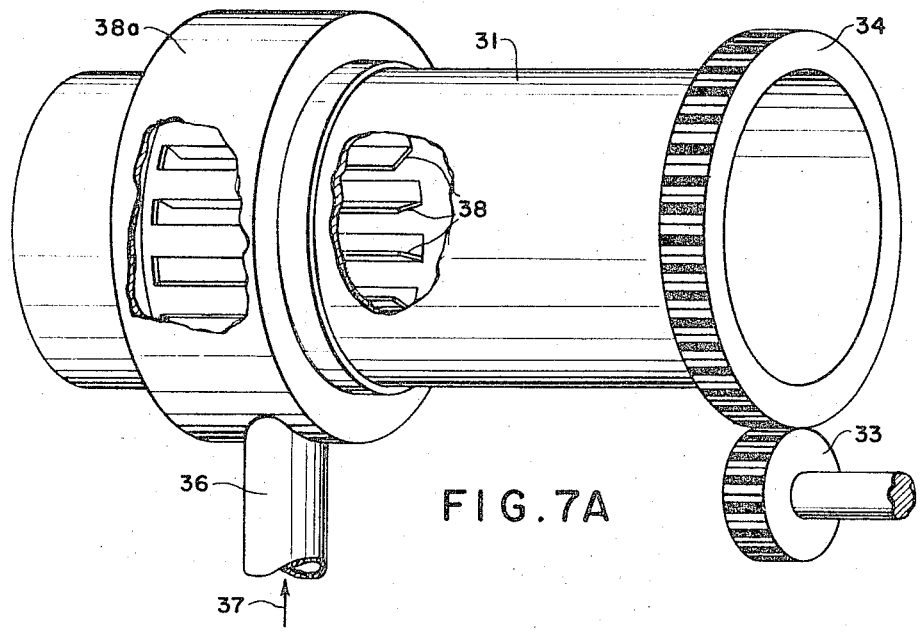
Figure 9:
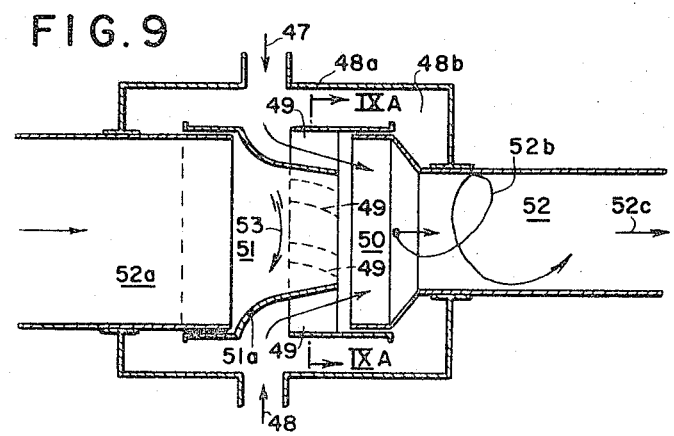
Figure 9A:
Figure 11:
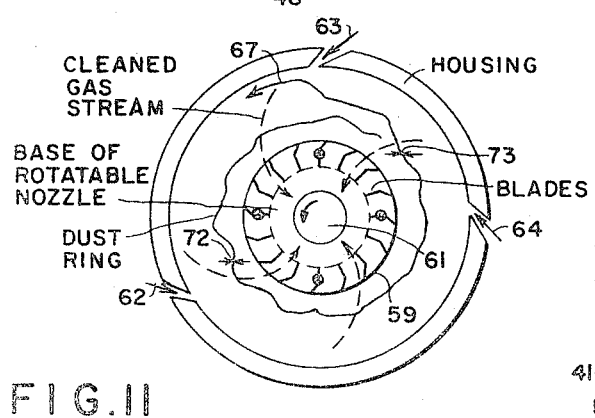
Figure 8:
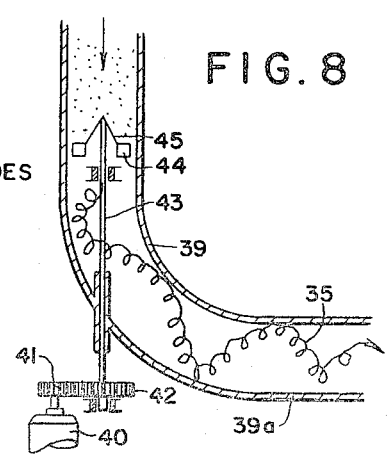
Figure 10A:
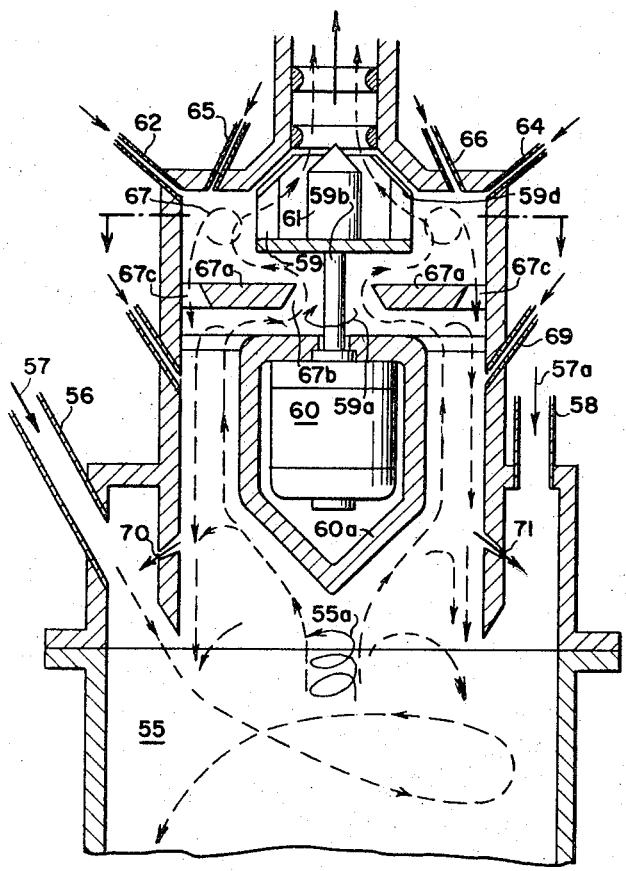
Figure 10B:
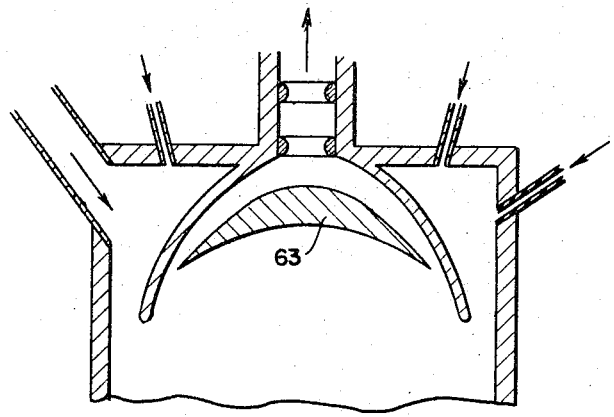

FIGS. 4 and 5 each show elevation views of the same device of FIG. 1 with a schematic indication of respectively different complex fluid flows;

FIG. 5A is a schematic cross-sectional view of the entire device according to FIGS. 1, 4 and 5, taken along line V-A—V-A of FIG. 5, but with the center suction duct omitted for clarity of illustration;

FIGS. 6, 7 and 8 illustrate schematically and in section three further embodiments of dust-conveying devices;

FIG. 7A is a perspective view, partially cut away, of the device of FIG. 7;

FIG. 9 is a sectional front view of another device according to the invention, operating with an auxiliary supply of air for superimposing a rotary fluid flow;

FIG. 9A is a schematic cross-sectional view of a blade wheel along line IX-A—IX-A in the device according to FIG. 9;

FIGS. 10a and 10b are vertical cross-sectional views of two further modifications respectively, both involving the injection of air or other gas for producing or aiding the superimposed rotary fluid flow;

FIG. 11 shows schematically a cross section of apparatus according to FIGS. 10a and 10b and along line XI—XI of FIG. 10a;

FIG. 12 is a perspective view of a dust separator apparatus operating according to the general principles of FIGS. 1–6;

FIG. 13 illustrates schematically and in section a rotary turbulence nozzle device;

FIG. 14 is a sectional view of another embodiment of a rotary turbulence nozzle;

FIG. 15 illustrates in longitudinal section a rotary blade assembly for producing a rotational flow; and FIG. 16 is a schematic view illustrating the over-all concept of the invention and showing a dust transporting conduit installation for handling and conveying solid particle material over relatively long distances.

Before describing the illustrated embodiments, the fluid-flow phenomena will be explained, the effects involved described, and definitions given for various terms used.

Fluid flows in which no internal friction occurs, are called "potential flow." Due to the absence of internal friction, a potential flow is not subjected to internal energy losses so that the total energy initially inherent in the flow remains preserved. In flows of fluid occurring in nature, friction is essentially limited only to the zones of the boundary layer to those surfaces which limit the flow, whereas the friction within the flow itself is approximately zero. At the contacted boundary surfaces the occurring friction results in formation of shearing forces which withdraw energy from the flow. This energy is in part consumed for releasing a secondary flow. Hence a distinction must be made between the primary flow constituted by the energy dissipating flow, and the secondary flow which received energy from the primary flow. In many cases, the secondary flow possesses greater technological importance than the primary flow causing the second flow.

When producing a flow within a containing vessel, the occurring secondary flow receives its energy from the shearing forces which the primary flow exerts upon any wall portions, for example upon the lateral walls, and on the so-called "ground." Without friction at boundary surfaces, no secondary flow can take place. With increased friction at the boundary surfaces, the shearing forces adjacent to the wall are increased and the resulting secondary flow is likewise increased. The original or impressed primary flow always becomes superimposed by a secondary flow as soon as any surfaces, for example, the side walls or the ground, limiting the flowing medium produce an appreciable amount of friction. In practice, this is always the case to a greater or lesser extent. The secondary flow caused by the shearing forces at the friction-producing surfaces penetrates far into the original, primary flow because the secondary flow, which may again be looked upon as being the source of a tertiary flow, may likewise have no appreciable internal friction. It is possible, therefore, that a secondary flow, in turn, may dissipate energy at a rough surface to a tertiary flow, whereby, of course, the formation of the secondary flow is subjected to modification.

The foregoing explanation forms a basis for the understanding of fluid motions which in fluid mechanics are termed "circulatory flow above a solid ground" and which are of interest for the present invention. It will be understood that, when a liquid in a cylindrical or similarly shaped rotationally-symmetrical vessel is subjected to stirring motion about the vessel axis, the flow produced by the stirrer can be looked upon as being a primary flow. This primary flow releases a secondary flow, the possible formation of tertiary or further derivative flows being at first ignored. With such a stirring motion, the liquid is not only placed in circulating motion at the outer rim of the vessel, but is also pressed downwardly. The flow lines directed downwardly at the external perimeter then run together on the bottom of the vessel near the vessel center, and the flow then moves upwardly in the center range. After reaching the surface zone, the flow lines again extend from the center radially outwardly.

This flow extending vertically downward and upward as well as toward the center at the bottom and toward the periphery at the top, superimposes itself upon the primary circulatory flow. Consequently, the liquid particles move on the periphery on a helical line downwardly but, when they reach the vessel bottom, the motion converts to an approximately logarithmic spiral along which the particles reach the center whence they rise near the center axis. The ascending motion in the center takes place in form of a rotational motion along a helical line of relatively narrow diameter (vortex filament) depending upon the active range of the shearing forces. On the top surface, the course of the flow again corresponds to a spiral, now extending from the center outwardly.

The flow motion just described constitutes a simple form of the one usually designated in fluid mechanics as "circulatory flow above a solid ground" (coffee-cup flow).

The merging of all flow lines in the center of the ground is tantamount to the formation of a vortex sink from which a vortex filament, being a rotational flow, extends upwardly. At a certain height, inversely proportional to the square root of the angular velocity, a special vortex source forms itself. In the vortex source there occurs a surprising effect explained further below.

If different substances are present in the flow, or if with one and the same medium there are particles of respectively different phase or configuration, then the particles split off from the vortex source are flung outwardly and may reach the downwardly directed stirrer flow located outside of the vortex source and extending helical-downward. This stirrer flow, representing the exciting or primary flow, conveys the flung-away particles to the outer rim zone of the vessel bottom. It is essential, however, that such particles are not driven against the vessel wall but are kept on a cylinder surface by virtue of non-centrifugal forces still to be explained. Consequently, the particles remain within the flow, and contrary to what is usually expected, are not carried by centrifugal forces against the vessel wall. It is obvious, therefore, that forces are active that are not identical with centrifugal force.

The distance of the vortex source from the solid bottom further depends upon the roughness of the bottom which, physically, constitutes the "solid ground." The excitation energy for the tertiary flow, taken from the secondary flow, increases with increasing roughness as will readily be understood from the foregoing explanations. Consequently the position and shape of the vortex source can be predetermined by the design of the rough ground. A concave ground imparts to the vortex source a shape contracted in the radial direction. A convex design of the ground results in deformation of the vortex source to a fuller shape radially expanded outwardly. In the latter case the vortex source closely approaches the external primary flow extending helically downward. Due to this short distance, there is a greater probability that a fluid particle flung out of such a vortex source will be carried out into the primary flow and will thus be separated. Consequently for each particle there is a certain separation probability which follows statistical laws and which, as a rule, is to be kept as high as possible in all cases where a separation, for example a dust separation, is desired. If the flow is to be utilized for reducing or eliminating noise or sound, then the boundary line or area, usually designated as "deformed plane" must extend as a closed area around the source of the sound. The foregoing examples will suffice for indicating the particular requirements that can be met by the circulatory flow, depending upon the particular purpose for which the invention is to be used.

The consideration of the resulting vortex sinks and vortex sources facilitates understanding the "relative forces" referred to in this disclosure. The vortex sink forming itself at the bottom of the processing vessel, is comparable with the vortex sink occurring when draining liquid through a drain pipe. The rotating velocity of the fluid particles increases when the particles approach the vortex filament, a phenomenon often observable when draining water from a bathtub. The peripherial velocity of the particles decreases gradually with increasing distance from the vortex source. The vortex filament extends between the vortex sink and the vortex source. While in a drainpipe, there occurs a downwardly directed helical motion, the flow conditions here of interest have a vortex filament, which as explained, extend upwardly.

If one lays an imaginary cross section horizontally through the vortex filament beneath the vortex source, the resulting flow-field picture is such that the peripheral speed of the fluid particles at first increases with increasing distance from the center of the vortex filament of the circulatory flow.

However, a different flow-field picture is obtained if one extends an imaginary cross section horizontally through the vortex sink in the vicinity of the bottom. Now the particles travel approximately on a logarithmic spiral inwardly. An imaginary horizontal cross section in the vicinity of the upper surface, extending through the vortex source, would show a travel of the particles substantially along a logarithmic spiral in the outward direction.

While a horizontal section through the middle of the processing vessel does not offer further interesting flow configurations, the imaginary horizontal sections in the vicinity of the top surface offer information about the particle motion on inwardly and outwardly directed spiral paths upon which an acceleration on the one hand, and a deceleration on the other hand is obtained. For a particle that, within the vortex filament, moves upwardly, the peripheral velocity, therefore, must change spontaneously as the particle enters into the vortex source. The same applies to the angular velocity because the particle, as set forth above, passes from a rotational flow into a potential flow and vice versa. Due to the occurring change in velocity and angular velocity, the particle is subjected to acceleration. Thus there occurs a force which is proportional to that acceleration and to the particle mass and which is directed toward the interior at the vortex sink and toward the outside at the vortex source. This force, having the character of a Coriolis force, is called "relative force."

Also effective, simultaneously with the relative force explained above, is a centrifugal force which has the same direction as the relative force in the vortex source, but which is opposed to the relative force in the vortex sink. As a result, a virtually spontaneous spreading-apart of the particles comes about in the vortex source, whereas a corresponding phenomenon in the vortex sink takes place more slowly and in the opposite sense. It will be recognized that the relative force must be considerably stronger than the centrifugal force.

It may be added at this place that, due to the circulatory flow, there is also produced an additional, sinusoidal relative force. The sinusoidal force, in accordance with a further feature of the invention, can be taken advantage of by virtue of the fact that it manifests itself, for example in air flows, as infra-sonic action and causes a viscosity increase by orders of magnitude, as will be further explained hereinbelow. As a result, for example when applying this phenomenon in a suitable boiler firing system, the combustion is considerably promoted.

The described relative forces, as explained, originate in the transition zone between rotational flow and potential flow, and the rotational flow may occur above or below the potential flow as well as within or outside thereof or also conjointly with the potential flow or at a plurality of localities in alternating sequence.

Reference is also made to the book, "Fluid Mechanics," by Victor L. Streeter, published by McGraw-Hill Book Co., Inc. 1951, for further definitions of the terms used herein.

In the drawings, like reference characters are used to designate functionally similar parts throughout the various figures.

Illustrated in FIG. 1 is a rotary nozzle with fixed guide blades 4 and running blades 3 driven by a motor (not shown) in a known manner through a shaft and spur gears. The tubular body of nozzle 1 may be in rotation in the direction of arrow 1A and connected to blades 3, or may be separate therefrom and stationary during operation of the device. A source of suction S is connected to the outlet end of nozzle 1. For improving the dust-entraining effect, a surface structure 2, constituting a hollow rough ground, is provided. Such a rough ground promotes the excitation of the rotary flow. The nozzle device is provided with a rotary blade assembly 3 and with a coaxial ring of stationary guide blades 4. A broken line 5 represents the upper surface of a mass of dust located on a supporting surface 15a (FIG. 3) and to be removed therefrom with the aid of the nozzle device. The motion of the conveying medium, for example air or other fluid, is indicated by a spiral line 6. The exhausted medium leaves the nozzle device in the direction of the arrow 7. The illustration of FIG. 1 represents the travel paths of the dust particles through the suction nozzle 1, and the rotary flow of the entrained dust particles in the upward direction.

The performance of such a device will now be explained with reference to FIG. 2 which particularly represents the flowing motion in the range of the running blades 3.

During rotation of the blade assembly 3, with or without simultaneous rotation of duct 1, a dust particle 8 which approaches the external edge of the rotatable blade 3 while still located in the blade channel, has the tendency to travel on an arithmetic spiral 9 (potential flow; vortex sink) when being pulled radially inwardly by the suction effect of source S as influenced by the rotating blades 3, which rotate in the direction of arrow 3a. Consequently, the dust particle 8 leads the rotating blade 3 until it impinges upon the next blade 3' and is deflected radially inwardly (rotational sink). This takes place approximately in the range or transition zone denoted by 10. In this zone there takes place a transition from a vortex sink to a rotational sink, so that there evolve relative forces which are directed radially inwardly and which additionally accelerate each particle 8. Consequently, a mixed, complex fluid flow obtains in the transition zone 10 in which small eddies 11, rotating at the reverse angular velocity, will occur; and these small eddies 11 are the starting point of respective rotational flows.

Shown in FIG. 3 in diagrammatic perspective view is a chain of the above-described small rotating eddies within the boundary layer above the surface of the dust pile, each eddy following directly the other and lifting itself off the dust surface. The eddies, forming the starting point 11 of a rotational flow, pull the dust upwardly from the support 15a. The dust surface which becomes surface 5 of FIG. 1 is symbolically illustrated in FIG. 3 as an originally planar surface 15a in order to simplify the representation. The rotational flow motion of the fluid medium entraining the particles produces a vortex sink represented by arrows 12 and 14. The boundary of the spacial vortex source is denoted by 15. The broken line 16 indicates the vortex filament axis around which the particle-conveying rotational flow 17 occurs. This rotational flow around the filament 16 is represented by a continuous curve 17 with directional arrow heads 13. As mentioned, these phenomenons take place in the boundary layer just above the surface 15a, 5 of the dust accumulation.

FIG. 4 again shows the rotary nozzle device of FIG. 1, except that the vortex filament 18 is indicated, this filament corresponding generally to filament 16, 17 of FIG. 3, but extending along the primary flow axis of the particular flow taking place in the illustrated apparatus. The filament 18 is formed between the stationary guide blades 4 and the running blades 3 at 11 within the interspaces or transition zone 10 of the running blade assembly (see FIG. 2. The individual dust-laden filaments again consist of rotational flows.

The above-described spiral chain of eddies 11 commences from each running blade 3. All small eddy chains and all eddies or whirls within the chain have the same sense of rotation and follow closely upon each other. In this manner, the surface 5 of the dust becomes deformed and there occurs a vortex source with a deformed plane as represented in FIG. 5. This deformed plane is schematically indicated by broken lines 19 and 20. Otherwise FIG. 5 corresponds to FIGS. 1 and 4. Particularly favorable results are obtained by shaping the running blades 3 in accordance with a logarithmic spiral curved, at least at their inner ends, toward the interior of the device see FIG. 5A).

The effect of the guiding blades 4 consisting in the formation of a potential-sink flow, can also be obtained by directing air under pressure to tangentially blow the air current (see FIG. 6) into the nozzle device instead of using the sucking arrangement indicated at S in FIG. 1. Another possibility is to maintain the nozzle 1 or container or the like in stationary position and to rotate the running-blade assembly 3 with a sufficient clearance from the wall of the stationary container. In this case, the running blades 3 may also have linear shape near the outer periphery of the running blade assembly and hence need not be curved over their entire, generally radial length (FIG. 5A).

The angles or curvatures of blades 3 and the speed of rotation are related to each other according to a given law of dependency. Changing in the rotary speed permits control of the sucking action of the nozzle device.

The so-called hollow ground represented at 2 in FIGS. 1, 4 and 5 is supported by rods or bolts 2a from nozzle duct 1 and has the effect of contracting the evolving spacial vortex source. The shape and position of structure 2 influences the efficiency and degree of the eliminated dust quantity by modifying or differently positioning the ground structure 2. The conical base 2b of the hollow-ground structure 2 also serves to push away the dust located in front of the nozzle inlet, thus preventing clogging or reduction of the conveying action by excessive accumulation of dust.

The embodiment of the rotary nozzle device shown in FIG. 6 serves for conveying dust in the downward direction. A conical shell structure 21 rotatable in the direction of arrow 21a about a vertical axis carries a number of running blades 22. The conical structure 21 is driven by a shaft, gears and motor (not shown) rotatably seated by bearing means (not shown) on a hollow-ground structure 23 which is concave in the downward direction. A suitable drive comprising a motor and power transmission means not shown) serves to rotate the structure 21, 22 relative to structure 23. The structure 23 is stationarily mounted by suitable fastening means, for example by two to four bolts 23a, on the stationary vessel bottom 24 of the device.

The performance, in principle, of the device of FIG. 6 corresponds to that described above with reference to FIGS. 1 to 5. A stationary connecting conduit 25 extends downwardly from the vessel bottom 24 of the device and serves as dust collecting means. During operation, a dust helix 26 is formed in conduit 25 and conveys the dust in the downward direction. Falling dust is indicated by dotted arrows 26a. The dust located on the conical shell structure 21 or dropping onto that structure slides downward along the conical surface toward the blades 22 where it directly enters between consecutive ones of blades 22. This design prevents clogging of the rotary nozzle device by the dust. Relative to the shape of the blades 22 and with respect to the use of stationary guide blades, such as 4 of FIGS. 1, 2, 4 and 5, in combination with rotating running blades shaped as logarithmic spirals, the same viewpoints apply as explained above with reference to FIGS. 5 and 5A.

The embodiment of FIG. 6 is further provided with a lateral nozzle tube 27 passing through and tangential to the wall 26 of the dust-receiving vessel 28. The nozzle tube 27 permits supplying air under pressure in a direction generally tangential to the primary fluid flow and inclined relative to the vessel axis. In lieu of a single blow nozzle 27, a number of such nozzles may be distributed over the vessel periphery. When operating with negative pressure within the vessel, which may be produced by a source of suction S connected to duct 25 in a manner similar to that shown in FIG. 1 for duct 1, the normal external atmospheric pressure suffices in some cases for producing the desired influx of air through such inclined nozzles 27 without added pressure applied to the latter.

The type of rotary-nozzle device shown in FIG. 6 is also applicable for the continuous removal of dust from flue-dust separators of the vertical or horizontal type. While the principle embodied in the device permits various structural modifications, it is essential in each case that the structure 21, 22 operate to obtain a conveyance of the dust toward the corresponding side wall 28 of the container, in contrast to the rotary-nozzle devices according to FIGS. 1 to 5 in which the direction of flow of the dust along path 18 is initially toward the opposite wall of housing or nozzle 1.

The method of accomplishing the desired fluid flows according to the invention in the various disclosed embodiments requires that the inwardly directed forces, i.e. the force components directed toward the central axis of the vessel, which are caused either by means of a suction source S or by a pressure source outside of the gas inlet, or both, must be stronger than the outwardly directed centrifugal forces stimulated by rotation of the running blades. This condition is a necessary prerequisite to the formation of and the existence of a "sink."

The term "sink" is defined in the above-mentioned book, "Fluid Mechanics," by Victor L. Streeter, as a negative source, a line into which fluid is flowing. A "source" is defined in the same book as a line normal to the $x$-$y$ plane, from which fluid is imagined to flow uniformly in all directions at right angles to it, the flow being in radial lines from the source. In three-dimensional flow a source is defined, according to the same book, as a point from which fluid is imagined to flow uniformly in all directions.

The peripheral speed of the rotating blades 3 of FIGS. 1 to 6, for best operation, must be approximately in the range of 0.2 to 1 m. per second for a blade radius of 5 to 8 cm. The smaller peripheral velocity $v_u$ is chosen, the greater is the probability that all particles are transported inwardly, because then the dragging forces at the particles will be large with respect to the centrifugal forces occurring. However, if peripheral velocity $v_u$ is too small, then no vortex hoses or filaments are excited, and no dust entrainment takes place. If $v_u$ is made too large, so that the centrifugal forces are greater than the dragging forces, then the dust particles remain outside of the rotating blades in a ring-shaped area which can be rinsed by tangential supply of air. Then the negative pressure caused by the blower still remains stronger than the centrifugal pressure effected by the rotating blades. However, if the blades run too rapidly, then the negative pressure caused by the blower S may be equalized by the centrifugal pressure or may even be overcome, so that ultimately the dust will be blown in the outward direction. The peripheral velocity for the blades 3, therefore, must be properly chosen.

Operation of the device of FIGS. 1 to 6 is generally as follows. Due to the suction from source S or from an outwardly located pressure source, a pressure differential is created so that the fluid medium flows over the dust-supporting surface 15a from the outer annular range outside of the guide blades 4. The flow through the blades 4 is potential flow and in the form of a vortex sink along logarithmic spirals. In the annular range of the running blades 3, the medium flows in a rotational flow in the form of a rotational sink on rotational or approximately arithmetic spirals; then the fluid flows into the central circular area of the conduit vessel, at first along logarithmic spirals and ultimately, due to friction on the rough ground 2, along a somewhat arithmetic spiral in an inward direction generally toward the vessel axis. Then the flow is from the center point generally along the vessel axis in the upward direction in the form of a vortex hose or filament, and subsequently to a spacial vortex source, thus forming in the inner circular area relative to FIG. 5A a turning flow excited by the potential flow. The vortex hoses extend upwardly from the vortex source, whereby there occurs, between the above-mentioned outer and inner annular ranges, a flow directed from below in the upward direction which entrains the air layers close to the surface 5 and, in this range, forms the starting points of vortex hoses turning in opposed directions. Within these vortex hoses the dust is conveyed inwardly into the turning flow and thence vertically in the upward direction.

In order to produce dust helices as desired for conveying dust through cylindrical pipes or other tubular conveying conduits, rotatably mounted vanes or blades corresponding generally to blades 3 or 22 may also be provided within the conveying conduit for rotation of such blades about an axis coincident with the conduit axis or at a slanting angle thereto. Embodiments of this type are shown in FIGS. 7, 7A and 8. In the device according to FIG. 7 and 7A the dust-laden primary flow of gas arrives through a stationary conduit 30 in the direction of the arrow 29. Coaxially connected to conduit 30 is a rotatable conduit 31 driven from a motor 32 through spur gears 33 and 34. The dust helix in the interior of the rotating conduit 31 is denoted by 35 and corresponds in general to the dust helix 18 of FIG. 5, except that it travels within a cylindrical conduit 31.

Compressed air is blown into the device of FIGS. 7 and 7A through a lateral pipe 36 and passes in the direction of the arrows 37 through a circular assembly of blades 30 fixedly mounted inside and rotatable with conduit 31. By giving the individual blades 38 of this blade assembly a suitable shape, namely a cross section extending on a path of an arithmetic spiral, the rotating blades 38 produce the effect required for generating the required potential rotational flow and the dust helices 35 essentially contribute to the generation of such helical flow, thus greatly increasing the conveying action. A stationary circumferential shell 38a supports the rotatable duct 31 on suitable bearings (not shown) and forms a spaced peripheral closure around the open vanes 38.

The device shown in the embodiment of FIG. 8 serves to convert dust travel paths of downwardly extending long filaments, as occurring when dust is permitted to drop by gravity, into helices 35 within a conveyor conduit 39 for thus securing a more intensive, accelerated dust removal and to direct the dust horizontally. The conduit 39 is curved at an angle of approximately 90° and has a horizontally extending portion 39a. The drive motor 40 with a step-down gearing 41, 42 is mounted outside of the curved elbow of duct 39 and drives a vertical shaft 43 for rotating the blade assembly 44. A stationary or rotatable conical shell 45 is mounted above the blades 44 and functions in a manner similar to the structure 21 of FIG. 6.

Aside from the use of rotary blades, such as 3, 22, 38, 44, a rotational flow can be excited exclusively or additionally by other means, particularly in cases where relatively long conveying distances are involved. One of such other means is the inclined-tangential blowing of gas into the processing space, such as at 27 already mentioned above relative to FIG. 6. Another of such means, serving to impart rotation to the conveying conduit itself is illustrated in FIG. 9. It has been found that combinations of these various means are particularly effective, for example the combination of the above-described rotating blade assembly together with an inclined-tangential supply of blowing gas such as 27 of FIG. 6. It is also of advantage in some cases to operate with negative pressure in the processing space, from a suction source as shown at S in FIG. 1, so that gas can be blown into the space with a reduced power demand, also as mentioned above. Another combination of the just-mentioned type is embodied in the device shown in FIGS. 9 and 9A.

The device of FIGS. 9 and 9A comprises an enclosed pressure space 51 located in a vessel which is inserted between two coaxially aligned conduits 52 and 52a for the main fluid flow; the vessel is additionally supplied with air under pressure in the direction of the arrows 47 and 48. A peripheral housing or shell, similar to the structure 38a of FIGS. 7, 7A, serves to enclose an annular space 48b. The air from 47 and 48 passing between the moving blades 49 of a blade assembly which rotates coaxially with conduit 52 and relative to stationary conduit 52a. The air thus enters in an inclined-tangential direction into primary flow passing through the conveying conduit line 52. At a location 50 closely behind the blades in the travel direction, the pressure becomes increased due to the narrowing structure of the walls 51a. In the conduit space 51 ahead of the blades enclosed by walls 51a a negative pressure is formed. In the latter space 51 there thus evolves a zone of rotational flow (singular range) at relatively very low pressure. The inclined-tangential direction of the compressed air issuing from the blade wheel assembly is due to the corresponding shape and arrangement of the individual rotating blades 49. A portion of the air enters with a twisting motion 52b into the conduit 52 and produces the potential flow component. In the mixed flow between the rotational sink and the vortex sink there occur the relative forces which impart axial motion to the flow in the direction of arrow 52c and thus produce the abovementioned negative pressure. The negative pressure thus produced can be varied within wide limits by varying the position and inclination of blades 49 and their blowing direction, and can thus be adapted to the particular conditions of the conveying conduit line 52, 52a.

FIG. 9A shows the wheel assembly of blades 49 rotating in the clockwise direction indicated by an arrow 53. The flow of air out of the blade wheel is represented by arrows 54. When the air leaves the individual blades 49, an increase in rotational air speed takes place as the air particles approach the central flow axis. This is tantamount to the production of a vortex sink, i.e. of a static reduction in local pressure. Due to the leading motion of the air masses mixed with the dust particles within the potential sink, the dust is compressed by the relative forces in the flow axis of the rotational sink. Consequently, the inclined-tangential blowing of gas into the processing space also produces an additionally active flow component.

A rotary-nozzle device as exemplified in FIGS. 1 through 6 is suitable not only for entrainment of dust but may also be used for dust separation. Then, however, the mutual spacing of the individual blades 3, 33 must be sufficiently narrow and the peripheral speed of the rotating blade assembly 3, 33 must be greater than required for entrainment of dust. The narrow channels between the blades prevent the mixed rotary and potential flow from starting already in these channels. An increased peripheral speed of the rotating blades increases the centrifugal forces imposed upon the dust particles by the rotational flow in the blade channels. In coaction with the relative forces directed radially inward and acting upon the dust particles, there occurs a force balance at the transition of the source of rotation (vortex sink) outside of the blade space. As a result, the mixed flow in which the dust is caught will be formed at a certain radial distance from the blades, this distance depending upon the peripheral speed of the blades and the speed of the medium passing through the intermediate blade channels. This again results in the formation of dust rings or eddies in conjunction with the phenomena of the deformed plane.

The devices shown in FIGS. 10a, 10b, and 11 exemplify the above-described rotary nozzle devices as applied to the separation and deposition of gas-entrained dust. According to FIG. 10a, a group of chambers is located above the precipitating space 55 of a separator housing structure. The dust-laden gas currents 57 and 57a are passed into the system of chambers through respective ducts 56 and 58, and additional gas is blown into the system in inclined-tangential direction at 68 and 69 and elsewhere. The primary flow of dust-laden gas current, here mainly considered, is introduced through the duct line 56 in the direction of the arrow 57. Another supply duct 58 is provided for the second dust-gas current 57a. The duct 58 is angularly inclined with respect to the plane of illustration. Located in the upper portion of the apparatus is a rotary-nozzle assembly 59 having blades 59c and sloping deflectors 59d, and which is placed in rotation in the direction of arrow 59a by means of a shaft 59b driven by a motor 60. The motor 60 is enclosed within a dust-proof housing 60a which is conically shaped at its lower end for improved flow of the fluid currents.

An annular shelf 67a having a central opening 67b through which shaft 59a extends, and lateral downwardly flared holes 67c serves to separate the chamber of structure 59 from the chamber of structure 60a. Dust-laden gas entering the precipitating space 55 from nozzles 57 and 58 flow in the direction of the dotted arrows and form a helical filament 55a. When the flow enters the chamber above shelf 67a, a dust ring 67 is formed.

By additionally blowing gas into the system in an inclined-tangential direction as shown in FIGS. 10a, 10b and 11, the evolving dust ring 67 can be torn open so that the dust is separated from the gas by a downwardly directed dust helix. For increasing the degree of dust removal it is essential to avoid the formation of the "singular range" (rotational sink, rotational axis) in the hollow space of the rotary nozzle.

For this purpose, a bolt or similar center structure is inserted. A further improvement in degree of dust separation is obtained by providing, according to the modification shown in FIG. 10b, a hollow solid ground 63 closely above the blades 59c of the rotary-nozzle assembly. The solid-ground structure 63 may have the illustrated downwardly concave shape of FIG. 10b, thus reducing the opening width of the spacial vortex source which is formed in the downward direction within the inner hollow space of the rotary nozzle 59. Thus a narrower conical shape of the spacial vortex source is obtained.

For further increase in degree of dust separation, a plurality of such rotary nozzles 59 may be disposed in series arrangement and may be speed-controlled independently of each other.

The course of the flow is indicated in FIGS. 10a and 11 by dotted arrows. The horizontal cross section shown in FIG. 11 is taken horizontally along line XI—XI at the height of the rotary-nozzle device 59 and at a right angle to the axis of rotation of shaft 59a.

Air is blown into the processing space outside of the rotary-nozzle assembly 59 in an inclined-tangential direction through nozzle openings 62, 63, 64 and 65, 66. This causes the evolving dust ring 67 to be torn open.

The lower portion of the apparatus of FIGS. 10a, 11 is also provided with inclined-tangential openings and annular nozzles 68, 69 and 70, 71 for blowing air into the processing space. Various arrows in FIG. 11 serve to represent the effect which causes tearing of the dust ring 67. Symbolically indicated at 72 and 73 by respective pairs of mutually opposed arrows are the relative forces which tend to maintain the dust particles in ring configuration, as more fully explained in the above-mentioned copending application Ser. No. 835,886.

FIG. 12 illustrates in perspective view an actual working model built to test the principles above illustrated and explained relative to FIGS. 1–6.

Most of the parts of FIG. 12 have been designated by numeral 200 plus the number of the functionally corresponding part of FIGS. 1–6.

In this model of FIG. 12 the entraining nozzle 201, provided with a blade ring 203 is kept stationary, and instead the surface 215a covered with dust is made rotatable, for the purpose of permitting an observation of the vortex hoses or filaments which occur between the blades 203.' A dust-filled transparent outer vessel 228 of cylindrical shape was placed in rotation by means of a rotating shaft 229 driven through gears 230 and 230a and was simultaneously displaced upwardly to lift the dust surface 215a relative to nozzle 201 with the aid of fixed nut 231 and a threaded spindle on the driving shaft 229. The rotatable gear 230a remains vertically stationary while spindle 229 rides upwardly through it and is rotated thereby by means of a sliding key 230b fixed to gear 230a but slidable in groove 230c of spindle 229. The nozzle 201 is fixed and glidingly protrudes into the upwardly movable cylindrical vessel 228. The air enters through the vertical air inlet nozzle 206 and is exhausted by the suction tube 207 of the dust-entraining nozzle 201. The nozzle 201 of this model was opaque, but the suction tube 228 was made transparent. During the operation, the formation of the vortex hoses or filaments and the dust helixes occurring in the transparent dust conveying tube could be observed.

In the separator embodiments so far described, the dust is eliminated in the downward direction, and the main axis of the separator is essentially vertical. However, the longitudinal or main axis may also be given any other desired direction in space, and the dust-separating stages, with or without rotary-nozzle devices, may be arranged in any desired sequence.

According to the embodiment of FIG. 13, the dust-laden gas enters into the separator in the direction of the arrow 85. Due to the curvature of the conduit walls 86, a rotational flow, symbolized by arrows, is formed in which the dust drops in the direction of the generally helical curve 87 and is deposited at 88 in the bottom portion of the dust-collecting vessel 89. In this vessel, an inclined-tangential introduction of the gas directed away from the vessel axis comes about. The cleaned medium leaves the vessel 89 in the direction of the arrow 90.

The radius of the curved conduit 86 in FIG. 13 is made sufficiently large so that the above-mentioned rotational flow can form itself in the conduit space which thus acts as a pre-separator. Indeed, for improving the degree of separation, it is generally favorable to have the dust-laden fluid enter the separator proper already in form of a rotational flow.

By providing a baffle wall 91 at the bight of the curved conduit 86 with a small hole or a small annular slot at the location denoted by 92, a fractional removal of dust is afforded. The dust-laden medium 85 flows towards the surface 91 in the form of a centrally extending dust helix of small diameter. Due to the curvature of conduit 86 the dust is flung out of this helix outwardly against the inner walls of conduit 86. Since, when traveling towards the surface 92, first the coarse and then the finer dust particles are flung out, the dust helix at the opening 92 consists only of very fine dust particles. The coarser particles flung out of the dust helix are entrained and eliminated downwardly into the container 89 by the rotational flow having the greater diameter of the path of circulation. Consequently, with greater length of the conduit 86, the dust dischargeable at the location 92 assumes a smaller size.

In the illustrated dust-separating devices a good separation is promoted by maintaining a proper pressure difference. The greatest static negative pressure P should obtain at the inlet conduit for the dust-laden fluid flow. Up to the negative-pressure nozzle, i.e., up to the point where the medium leaves the processing space and passes to a suction outlet such as the entrance of an exhaust fan or suction source S (FIG. 1) or the like, the static negative pressure should increase from stage to stage. That is, it is generally favorable to have the medium drawn rather than being pushed through the separator. In this respect, the following is of interest.

The floating condition of a particle in a fluid medium is characterized by force balance between the weight $g$ of the particle acting vertically downward and the opposingly acting, shoving force F. With increasing static pressure P, the gravity-opposing forces F acting upon the particle also increase because the static pressure P and the force F are functionally interrelated, if $P=0$, the opposing forces F vanish, and the dust particles drop under their own gravity. Since all bodies drop at the same speed in an evacuated space, the smallest dust particle in the atmosphere can float in the highest air layers because, due to their very slight weight, the buoyancy forces F produced at the slight atmospheric pressure F are just sufficient for force balance. At these altitudes, the larger dust particles would slip downward because the buoyancy forces F are no longer equal to the weight g of such larger dust particles. Neglected in this consideration, of course, are air movements as well as variations of the masses and buoyancy forces with variable particle sizes.

It follows from the foregoing that an increased negative pressure in a separator improves the separation of small particles. Consequently, the degree of dust separation for small grain sizes is improved by lowering the static pressure P in the separator, particularly when utilizing the rotational flow in accordance with the present invention. That is, the relative forces occurring in the rotation flow have a greater effect upon the dust particles at a smaller static pressure P in the separator and at correspondingly decreased buoyant forces F.

The relative forces then suffice to convey the dust at accelerated speed through the separator space in form of dust helices. By reducing the cross section of each subsequent stage within a separator device, and by increasing the exhausting speed of the medium, the static pressure forming itself in the individual stages is reduced and the degree of dust separation is accordingly increased. The increased peripheral speed of the medium caused by the tangentially supplied additional amount of air or gas, results in additional decrease of the static pressure P within the dust-separator space in the radially inward direction and thus further improves separation. The cleaned air or gas therefore must pass into the second or further separating stage through an opening located as closely as feasible to the center of the separator device. When providing the outlet openings eccentrically, suitable nozzles of inclined-tagential direction must take care of also guiding the axis of rotary flow in an eccentric direction.

In positive-pressure separators, the compressed air blown into the separator space in an inclined-tangential direction causes a static negative pressure in the separator itself, due to the increase in peripheral speed of the gas flow. A further increase in static negative pressure is caused by removing the dust from the separator with the aid of a negative-pressure producing device, for example a rotary-nozzle device according to FIG. 1. This also improves the degree of dust separation. In many cases a combination of a conventional dust-removing device, for example a chimney, with the above-described devices according to the invention for conveying dust in tubular conduits can be utilized for increasing the degree of dust elimination. In most cases, such a combination permits reducing the operating expenses of an entire plant. Of course, the above-described nozzle-type separators and other devices are also applicable individually.

FIG. 14 shows schematically a rotary-turbulence nozzle. A cylindrical conduit 93 constitutes the dust-separator space. The dust-laden medium is supplied in the direction of arrow 94 into a tube or conduit 95. While in the embodiment of FIG. 13 a hook-shaped knee of small curvature radius is employed, the conduit 95 in the device of FIG. 14 forms an acute angle. The presence of a sharp edge 96 is essential in this device. The knee conduit 95 is provided with a rotary set of blades 97 between the edge 96 and the space in separator conduit 93. The blades 97 are driven by a motor (not illustrated) during operation of the separator. The path of the flowing medium and of the dust particles is symbolized by arrows and dots. For blowing gas into the processing space proper in an inclined-tangential direction for the purpose of generating the potential flow and for tearing the evolving dust rings, a turbulent flow is considerably better suitable than a laminar flow, for example in chimney-dust separators. Consequently, if the excitation of the rotational flow is effected by means of a turbulence nozzle, particularly good results are obtainable. For that reason, a turbulence nozzle as shown in FIG. 14 is advantageously applicable as an inlet conduit for a device according to the invention. The turbulence produced by passing the flow of medium over a sharp edge, is augmented by the additional provision of the rotary-blade assembly 97.

The same effect as with the sharp edge 96 can also be obtained if the air current is passed through one or more openings, for example of circular cross section, which may also be provided with a sharp edge, if desired. A series arrangement of several such nozzles can be used, and the shape of the edge can be varied to a great extent. For example, teeth or ridges or a conical construction may be disposed behind the edge in the flow direction.

An embodiment of the last-mentioned features is illustrated in FIG. 15. A rotary-blade assembly with two rings of blades 98 and 99 is provided for producing a rotational flow. The blade assemblies may be rotatable relative to the nozzle housing, or the entire nozzle together with the blades may be placed in rotation. Provided at 100 is a stationary conduit structure in which the illustrated nozzle 101 is rotatable as a single unit. Located between the two blade circles 98 and 99 is a zone of sharp ring-shaped ridges 102. The nozzle mouth 103 is provided with similar ridges 104.

FIG. 16 illustrates the relationship of the other figures to the overall concept of the invention. FIG. 16 shows schematically a dust transporting conduit or conveying installation applicable for handling and conveying solid particle material by entrainment in a fluid over relatively long distances. The pulverulent or granular material enters at 301 of FIG. 16, in most cases mixed with air or another fluid conveying medium, as illustrated in FIGS. 1–6 and 12. Consequently, in the part or method step at 301 according to FIG. 16, at the dust inlet there occurs an energy supply with a first generation of twisting motion for producing the rotation of a flow which is to convey the dust. The material to be conveyed moves along a helical travel path through the conveying conduit line. When, after a given travel distance, the initial twist imparted to the dust or fluid subsides, a guiding or agitating device, at 302 in FIG. 16, again imparts a new twisting motion to the material being conveyed. The twist generation supplied at 302 of FIG. 16 is generally stationary at a location spaced from the initial agitation at 301, and may be of the type illustrated in FIGS. 14, 10a and 11 of the application.

A supply of additional secondary air may be introduced at 305, which corresponds to a supply of fresh air introduced at 206 of FIG. 12; or either fresh or dust-laden air at 94 of FIG. 14, where this supply of secondary air is whirled or pre-twisted over the sharp edge 97 of FIG. 14 in order to augment or amplify the twist of the conveying flow. FIG. 11 and FIG. 10a illustrate a rotating system of guiding vanes, the upper portion of FIG. 10a showing additional injection of secondary air at 62, 63, 64, 65 and 66. However, this guide-vane system may also be employed for simply producing a twist in the conveying line, even without the injection of secondary fresh air.

When, after repeated excitation by stationary guiding devices, the twist subsides or is depleted, a twist generation with additional energy supply must take place as indicated at 303 of the conveying line shown in FIG. 16. This part or step at 303 is represented by devices according to FIGS. 7–9. FIG. 8 illustrates a modification of the helical movement in front of a curve or knee of the conveying conduit.

After sufficient new energy is supplied to the conveying medium and to the material entrained therein to be conveyed, a further twist excitation can again be generated by stationary guiding devices indicated at 302', to the right of part 303 of FIG. 16. At the end of the conveying line, at 304 of FIG. 16, there occurs a precipitation or settling out of the pulverulent or granular material in separators, for example as shown in FIGS. 10a, 10b and 13.

The term "conduit vessel" as used herein describes a structure which performs the functions of both a conduit and a vessel; namely, by forming a passage for the flow of fluid medium therethrough it is a conduit, and by forming a space in which the recited fluid-flow phenomena take place it is a vessel. Thus, all portions of the structure need not be part of a direct conduit passage.

The invention is applicable for purposes other than so far mentioned, for example for conveying coal dust over long distances. The invention is further applicable for dust or other pulverulent particles suspended in a liquid medium. For example, sludge pumps can be given improved efficiency by applying the present invention. Such and other modifications, beyond the embodiments particularly illustrated and described herein, will be obvious to those skilled in the art, upon a study of this disclosure, and are intended to be within the scope of the claims annexed hereto.

We claim:

1. The method of handling solid particle material by entrainment in fluid, which comprises passing a primary flow of particle-laden fluid in a given flow direction and along a predetermined axis through enclosed conduit means having a solid ground transverse to said given primary flow direction, applying a suction to said fluid to create radial flow forces in said fluid toward said axis, agitating said fluid to create rotation thereof about said axis so as to create radial centrifugal forces in said fluid in a direction away from said axis, and controlling said radial flow forces relative to each other to create a sink in said fluid, whereby the entrained particle material travels in a helical path through said conduit means.

2. The method of handling solid particle materials by entrainment in fluid, which comprises passing a primary flow of particle-laden fluid in a given flow direction and along a predetermined axis through enclosed conduit means having a solid ground transverse to said given primary flow direction, applying a pressure differential to said fluid to create radial flow forces in said fluid toward said axis, agitating said fluid near said solid ground to create a rotary flow motion in a direction generally around said axis at a rotary speed such as to create radial centrifugal flow forces away from said axis which are less than said forces toward said axis, and controlling said pressure differential and said agitating relative to each other so that a sink is created in said fluid and so that the entrained particle material is conveyed in a helical path through said conduit means.

3. Method according to claim 1, including the step of further agitating said fluid at a location along said conduit means remote from the first mentioned agitation of the fluid to augment said rotation thereof about said axis.

4. Method according to claim 1, said step of agitating the fluid comprising impressing a twisting force on said primary flow of particle-laden fluid at a predetermined location along said enclosed conduit means to create helical rotation of said particle-laden fluid about said axis.

5. Method according to claim 4, including the step of impressing a twisting force on said primary flow of particle-laden fluid at a further location along said enclosed conduit means spaced from predetermined location in the flow direction in order to further convey said flow of fluid along said conduit means.

6. Method according to claim 5, including the steps of introducing into said flow a quantity of particle-free fluid at a location further along said conduit means, and collecting settled-out particles from the fluid at a remote location still further along said conduit means in the flow direction.

7. Method according to claim 3, said step of further agitating the fluid comprising passing the flowing particle-laden fluid into a chamber and applying a twisting motion thereto with rotating guiding vanes.

8. Method according to claim 3, said step of further agitating the fluid comprising introducing additional fluid in a direction at an angle to the flow axis and tangential to a circle centered on said axis.

9. Method according to claim 3, including the further step of passing the flowing particle-laden fluid from said conduit means into a chamber to precipitate the particles from the fluid, and separating the particles from the fluid.

10. Method according to claim 3, including the step of introducing fluid free of particles into said primary flow, and separating out particle materials from entrainment in said fluid flow at a remote collecting location along said conduit means.

11. The method of handling particle material by entrainment in fluid, which comprises subjecting the particle material to a flow of fluid medium within an enclosed processing space, passing a primary flow of said medium through said space in a given flow direction and providing in said space a solid ground having a direction generally transverse to the direction of the primary flow, superimposing upon the primary flow above the solid ground an agitating force in a direction generally tangential to the primary flow and inclined toward the primary-flow axis to superimpose upon the primary flow a circulatory secondary flow forming a vortex sink near the solid ground and a vortex source remote from the solid ground, and thereby forming a suspension of said material within the fluid medium within a mixing zone within said circulatory flow due to fluid-internal forces created.

12. The method of handling materials in pulverulent condition for collecting, conveying, separating, and discharging said materials, which comprises subjecting said materials in pulverulent form to a flow of fluid medium within an enclosed processing space, passing a primary flow of said medium through said space in a given flow direction to define a primary-flow axis for the fluid, superimposing upon the primary flow an agitating force in a direction generally tangential to the primary flow and inclined toward said primary flow axis and having a component in opposition to said primary flow to superimpose upon said primary flow a circulatory secondary flow forming a vortex sink and a vortex source spaced from each other along said primary flow axis, whereby fluid-entrained solid particles of said material are caused to be suspended within said space in the form of at least one cylindrical dust ring due to fluid-internal relative forces created by said flows, and controlling said primary and secondary flows relative to each other to disperse said dust ring and move said materials in a desired direction.

13. The method according to claim 12 which comprises passing said fluid medium upwardly through said processing space, and moving said materials from said dust ring in the upward direction out of said processing space.

14. The method according to claim 1, wherein said fluid medium is a gas.

15. The method according to claim 1, which comprises blowing additional fluid medium into said processing space in a direction tangential to said primary flow direction and opposingly inclined thereto.

References Cited by the Examiner

UNITED STATES PATENTS 2,494,465  1/1950  Watson _____ 55—261

FOREIGN PATENTS 849,349  9/1952  Germany.
752,353  7/1956  Great Britain.

ANDRES H. NIELSEN, *Primary Examiner.*